N. W. PAYNTER.
Siphons.
No. 135,935. Patented Feb. 18, 1873.
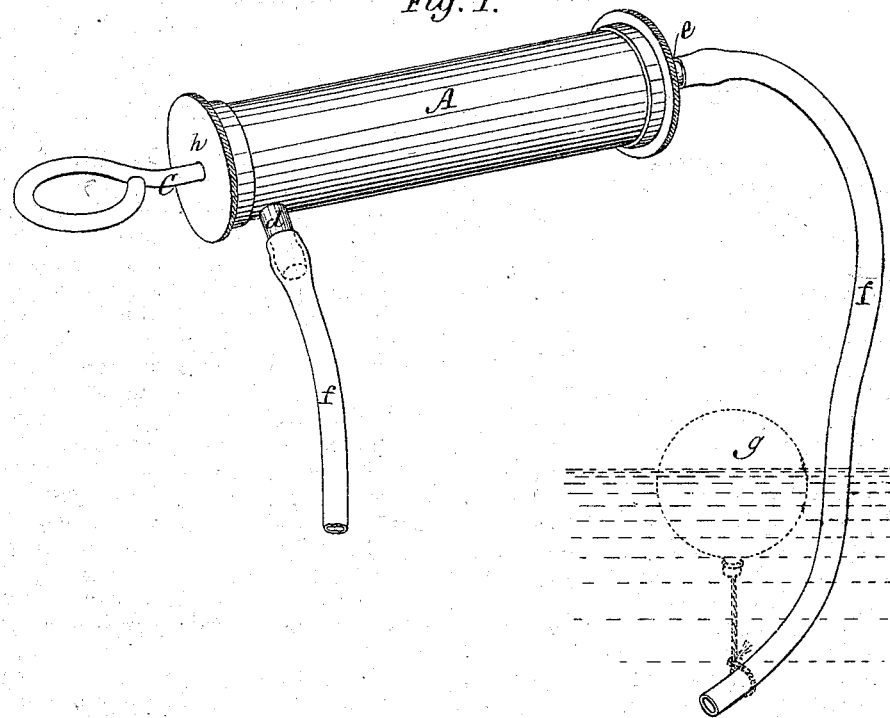
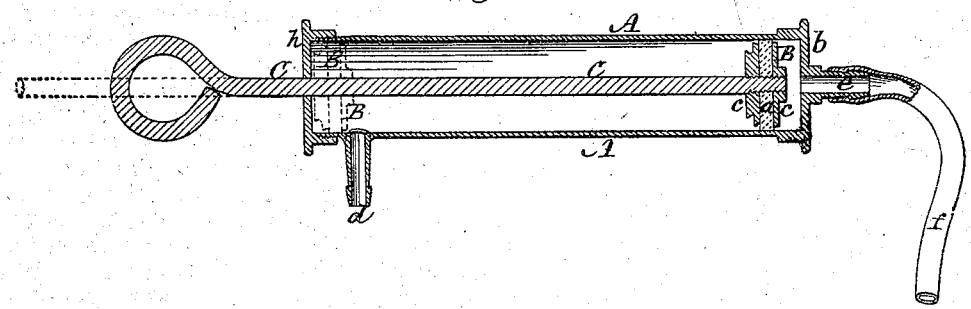
Witnesses.
Jno. Williams
Edmund Masson
Inventor.
Nathaniel W. Paynter
By atty. A. B. Stoughton.

UNITED STATES PATENT OFFICE.

NATHANIEL W. PAYNTER, OF BALTIMORE, MARYLAND.

IMPROVEMENT IN SIPHONS.

Specification forming part of Letters Patent No. 135,935, dated February 18, 1873.

*To all whom it may concern:*

Be it known that I, NATHANIEL W. PAYNTER, of Baltimore, in the State of Maryland, have invented certain new and useful Improvements in Siphons; and I do hereby declare the following to be a full, clear, and exact description of the same, reference being had to the accompanying drawing making a part of this specification, in which—

Figure 1 represents a perspective view of the siphon. Fig. 2 represents a longitudinal section through the same.

I am aware that a combined pump and siphon has been essayed, but this involves the use of valves in the siphon, against the action of which the liquid must flow; and for this reason such an apparatus is not efficient as a siphon. I am also aware that in a combined pump and siphon the through flow can be shut off by the piston of the pump, but to do this, the piston is moved the whole length of the pump-cylinder, and the vacuum is destroyed, and must again be restored before the apparatus will work as a siphon. To such a contrivance or combination I lay no claim whatever, as I neither use valves in the line of the through flow, nor do I destroy the vacuum in the siphon when I shut off or let on the flow of liquid through the siphon, and consequently do not have to restore the vacuum after stopping the flow of liquid.

My invention relates to a siphon composed of a cylinder, piston, and rod, and having valveless pipes or passages connected therewith, so that, by drawing the piston from the inlet to the outlet passages, or rather past the outlet, a vacuum is produced into which the liquid flows, and thence out of the outlet, and so that, by moving the piston just past, or the distance of the diameter of the outlet-opening, the flow shall be stopped without destroying the vacuum, and by moving the piston again beyond the outlet the through flow will be again resumed, as will be explained.

To enable others skilled in the art to make and use my invention, I will proceed to describe the same with reference to the drawing.

A is a metallic cylinder, in which a piston, B, properly packed, snugly works, and to this piston is connected a rod, c, which extends through one of the heads of the cylinder, and is furnished with an eye or handle by which it can be readily operated. The piston may be composed of a rubber disk, a, secured between the metal heads c c, one of which latter may be fixed, and the other capable of being brought up hard against the rubber to expand it diametrically and cause it to snugly fit the interior of the cylinder. In the end b of the cylinder is arranged the inlet-pipe or passage e, and near the opposite end of the cylinder is arranged the outlet-pipe or passage d, and these pipes or passages, one or both, may be continued, by means of rubber or other flexible tubing f, so as to reach the points where the liquid is to be drawn from or carried to. To the inlet-tube f is connected a float, g, which keeps the lower end of said tube just below the surface of the liquid to be drawn off without taking in the sediment at the bottom thereof.

To operate this siphon, it is put in the position shown in the drawing in black lines, and the inlet-tube f connected with the pipe or passage e is inserted in the liquid to be siphoned off. The piston B, by means of its rod C, is then drawn through the cylinder into the position shown in the dotted lines at the end h thereof. The liquid, through the tube and passage e, follows the piston, and when the latter has passed the outlet-opening d the liquid flows out through said passage, and may be carried into bottles or any other holders, by the hose or tube connected to the pipe d. When it is desired to cut off the through flow, as in filling bottles, so as to change the tube without wasting the liquid, it is only necessary to move the piston B until it covers the opening d, when the flow ceases at once. When the tube is inserted in another bottle the piston is again moved so as to disclose the opening d, and the liquid will again run through the siphon. In moving the piston to cover the outlet d, which requires but a small extent of movement, the vacuum is not impaired in the siphon to any injurious extent, and the moment it (the piston) is drawn back to disclose the opening the vacuum is fully restored and in full effect again, so that the operator, by moving the piston— say, for ordinary siphons—half an inch, has full control of the through-flow, stopping it off and letting it on, at pleasure, without destroying or renewing the vacuum.

Having thus fully described my invention, what I claim is—

1. A siphon composed of the cylinder A, piston B, and inlet and outlet passages $e$ $d$, arranged and operating together as and for the purpose described and represented.

2. In combination with the tube $f$, which forms a continuation of the inlet-passage $e$ of the siphon, a float or buoy, $g$, for sustaining the lower enk of said tube near the surface of the liquid to be siphoned off, as and for the purpose described.

NATHANIEL W. PAYNTER.

Witnesses:
G. W. NORRIS,
S. C. LONG.